United States Patent
Olomskiy (10) Patent No.: US 9,851,893 B2
(45) Date of Patent: Dec. 26, 2017

(54) SYSTEM AND METHOD FOR PROVIDING A PLURALITY OF GRAPHICAL USER INTERFACES TO A USER

(75) Inventor: Evgeny Olomskiy, Vladivostok (RU)

(73) Assignee: Zotobi Management Ltd., Tortola (VG)

( * ) Notice: Subject to any disclaimer, the term of this patent is extended or adjusted under 35 U.S.C. 154(b) by 0 days.

(21) Appl. No.: 13/449,108

(22) Filed: Apr. 17, 2012

(65) Prior Publication Data

US 2013/0275909 A1   Oct. 17, 2013

(51) Int. Cl.
*G06F 3/0488* (2013.01)
*G06F 9/44* (2006.01)

(52) U.S. Cl.
CPC ...... *G06F 3/04883* (2013.01); *G06F 3/04886* (2013.01); *G06F 8/38* (2013.01); *G06F 9/4443* (2013.01)

(58) Field of Classification Search
CPC ......... G06F 3/0483; G06F 3/0481; G06F 17/30056; G06F 2203/04803; G06F 9/4443; G06F 3/0482; G06F 3/04842; G06F 3/017; G06F 3/04883; G06F 3/04886; G06F 8/38
USPC .................................. 715/781, 767, 802
See application file for complete search history.

(56) References Cited

U.S. PATENT DOCUMENTS

| | | |
|---|---|---|
| 5,305,435 A | 4/1994 | Bronson |
| 5,543,591 A * | 8/1996 | Gillespie ............ G06F 3/038 178/18.03 |
| 5,848,058 A | 12/1998 | Ooyoshi |
| 6,351,764 B1 | 2/2002 | Voticky |
| 6,652,378 B2 | 11/2003 | Cannon et al. ............. 463/20 |
| 6,832,244 B1 | 12/2004 | Raghunandan |
| 7,008,319 B2 | 3/2006 | Montgomery et al. ...... 463/21 |
| 7,266,186 B1 | 9/2007 | Henderson |
| 7,438,642 B2 | 10/2008 | Walker et al. ............. 463/30 |
| 7,454,716 B2 | 11/2008 | Venolia |
| 7,988,549 B2 | 8/2011 | Little ........................ 463/20 |
| 8,402,374 B1 | 3/2013 | Rose |
| 8,453,057 B2 | 5/2013 | Stallings |
| 2002/0038213 A1 | 3/2002 | Adachi |
| 2002/0191029 A1 * | 12/2002 | Gillespie ............ G06F 3/0488 715/810 |
| 2003/0130849 A1 | 7/2003 | Durston |
| 2003/0189597 A1 * | 10/2003 | Anderson ............ G06F 3/0481 715/778 |
| 2004/0015548 A1 | 1/2004 | Lee |
| 2004/0021686 A1 | 2/2004 | Barberis |

(Continued)

*Primary Examiner* — Jennifer To
*Assistant Examiner* — Terri Filosi
(74) *Attorney, Agent, or Firm* — Pillsbury Winthrop Shaw Pittman LLP (57) ABSTRACT

Management by a user of a plurality of graphical user interfaces associated with different activities may be facilitated on a computing platform. This management may be achieved by providing an intuitive way to change operation of an electronic display between a first mode, in which a single graphical user interface may be prominently displayed, and a second mode, in which an array of graphical user interfaces corresponding to ongoing activities may be displayed. Selection of one of the graphical user interfaces presented in the array may result in the electronic display transitioning back to the first mode with the selected graphical user interface as the active graphical user interface.

20 Claims, 5 Drawing Sheets

(56) References Cited

U.S. PATENT DOCUMENTS

| | | |
|---|---|---|
| 2005/0068167 A1 | 3/2005 | Boyer |
| 2005/0114871 A1 | 5/2005 | Wolff |
| 2005/0193345 A1 | 9/2005 | Klassen |
| 2005/0233794 A1 | 10/2005 | Cannon et al. ............ 463/16 |
| 2006/0084450 A1 | 4/2006 | Dam Nielsen |
| 2006/0117263 A1 | 6/2006 | Locke |
| 2006/0121971 A1 | 6/2006 | Slomiany |
| 2006/0123353 A1* | 6/2006 | Matthews et al. ............ 715/779 |
| 2009/0228791 A1* | 9/2009 | Kim .................. G06F 3/0414 715/702 |
| 2009/0293007 A1 | 11/2009 | Duarte |
| 2010/0095240 A1* | 4/2010 | Shiplacoff et al. .......... 715/784 |
| 2010/0107123 A1* | 4/2010 | Sareen et al. ............... 715/835 |
| 2010/0306702 A1* | 12/2010 | Warner ....................... 715/811 |
| 2011/0072394 A1* | 3/2011 | Victor .................. G06F 3/0482 715/821 |
| 2011/0105224 A1 | 5/2011 | Hartmann |

* cited by examiner

SYSTEM AND METHOD FOR PROVIDING A PLURALITY OF GRAPHICAL USER INTERFACES TO A USER

FIELD

The disclosure relates to providing access to a plurality of graphical user interfaces to a user on a computing platform with a touch sensitive surface, wherein the graphical user interfaces correspond to different activities being provided to the user through the computing platform concomitantly.

BACKGROUND

Conventional computing platforms enable users to participate in activities provided by different applications. As the processing and memory capabilities of conventional computing platforms increases, computing platforms have become capable of providing access to more and more activities simultaneously.

Generally, a computing platform may generate separate graphical user interfaces (e.g., control interfaces and/or other graphical user interfaces) for individual activities. Navigation through a plurality of these graphical user interfaces may not be intuitive for users of conventional systems. The presentations of one graphical user interface may obscure the view of other graphical user interfaces, and there may not be a convenient and/or efficient way to transition between the graphical user interfaces and/or to locate a specific graphical user interface from among the plurality of graphical user interfaces being presented.

SUMMARY

One aspect of the disclosure relates to facilitating management by a user of a plurality of graphical user interfaces associated with different activities. This management may be achieved by providing an intuitive way to change operation of an electronic display between a first mode, in which a single graphical user interface may be prominently displayed, and a second mode, in which an array of graphical user interfaces corresponding to ongoing activities may be displayed. Selection of one of the graphical user interfaces presented in the array may result in the electronic display transitioning back to the first mode with the selected graphical user interface as the active graphical user interface. These features may enhance the usability and/or intuitiveness of the graphical user interfaces generally, and/or the computing platform generating the graphical user interfaces.

The mode of operation may be changed between the first mode and the second mode responsive to reception of a first control input, a second control input, and/or other control inputs. The first control input may include a double contact tap to a touch sensitive surface. The second control input may include a single contact tap to the touch sensitive surface. A double contact tap may include an input in which the user makes two concomitant contacts. As such, by virtue of making simultaneous contact at two separate locations on the touch sensitive surface (e.g., with two separate fingers), the user may effect a different command than a similar single contact with the touch sensitive surface (e.g., with a single finger). It will be appreciated that the differentiation between control inputs may be expanded to additional numbers of contacts. For example, a triple contact tap (e.g., with three fingers simultaneously) may correspond to a third control input that is different from the first control input and/or the second control input. As another example, a quadruple contact tap (e.g., with four fingers simultaneously) may correspond to a fourth control input that is different from the first, second, and/or third control input.

In some implementations, a computing platform configured to facilitate management by a user of a plurality of user interfaces associated with different activities is configured to execute one or more of at least one application module, at least one interface module, a touch input interface module, and a display control module.

The application modules may be configured to provide functionality associated with individual applications executed by the computing platform. The application modules may be contrasted with system software and/or middleware, which may be configured to manage and integrate the capabilities of the computing platform, but may not directly apply such capabilities directly in the performance of tasks under the direction of and/or for the benefit of the user. The specific tasks managed by the application modules may provide access to one or more activities to the user. An activity may include actions taken only locally on the computing platform.

The interface modules may be configured to generate graphical user interfaces associated with different activities being presented to the user on the computing platform. The graphical user interfaces may be presented to the user on an electronic display associated with the computing platform. The interface modules may include a first interface module, a second interface module, and/or other interface modules. The first interface module may be configured to generate a first graphical user interface associated with a first activity. The second interface module may be configured to generate a second graphical user interface associated with a second activity.

The touch input interface module may be configured to detect input to a touch sensitive surface associated with the computing platform. The touch input interface module may be configured to make such detections based on output signals generated by the touch sensitive surface. The detections made by the touch input interface module may include detection of the first control input, the second control input, and/or other control inputs.

The display control module may be configured to control the electronic display to operate in a first mode, a second mode, and/or other modes. In the first mode, an active graphical user interface may be displayed prominently on the electronic display to facilitate user interaction with the activity associated with the active graphical user interface. In the second mode, an array of graphical user interfaces may be displayed concomitantly.

The display control module may be configured such that as the electronic display is being operated in the first mode, responsive to detection of the first control input, operation of the electronic display is switched to the second mode. The display control module may be configured such that as the electronic display is being operated in the second mode, responsive to detection of the second control input, operation of the electronic display is switched to the first mode. During this switch, the graphical user interface presented as the active graphical user interface may be the graphical user interface corresponding to a location on the touch sensitive surface at which the second control input was input by the user. In some implementations, the electronic display and the touch sensitive surface may be implemented as a touch screen. In such implementations, the locations on the touch sensitive surface corresponding to the different graphical user interfaces in the array may be the locations on the touch screen at which the different graphical user interfaces are displayed.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
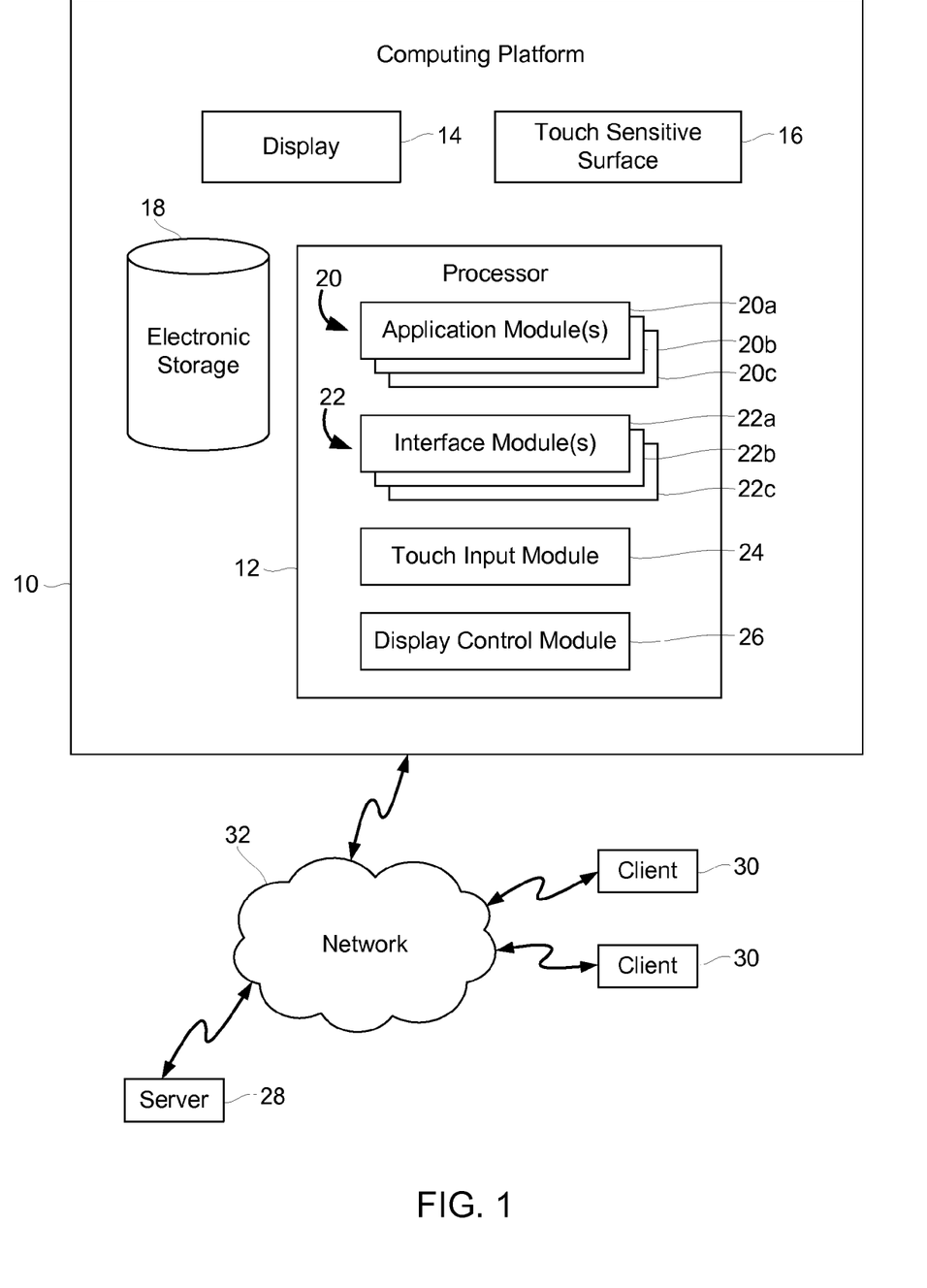
FIG. 1 illustrates a computing platform configured to facilitate management by a user of a plurality of user interfaces associated with different activities.

FIG. 1 illustrates a computing platform 10 configured to facilitate management by a user of a plurality of user interfaces associated with different activities. The access provided for the user to the user interfaces may have an enhanced intuitiveness, effectiveness, and/or efficiency. This may enhance the usability of computing platform 10 and/or of one or more applications being executed on computing platform 10. By way of non-limiting example, client computing platform 10 may include one or more of a desktop computer, a laptop computer, a handheld computer, a tablet computing platform, a NetBook, a Smartphone, a gaming console, and/or other computing platforms. In some implementations, computing platform 10 may include one or more of one or more processors 12, an electronic display 14, a touch sensitive surface 16, electronic storage 18, and/or other components.

Processor 12 may be configured to execute one or more computer program modules. The computer program modules may include one or more of at least one application module 20, at least one interface module 22, a touch input module 24, a display control module 26, and/or other modules.

Application modules 20 may be configured to provide functionality associated with individual applications executed by processor 12. Application modules 20 may include a first application module 20a, a second application module 20b, an $n^{th}$ application module 20n, and/or other application modules. Application modules 20 may be defined by processor executable instructions (e.g., software and/or other instructions). An individual one of application modules 20 may be designed to help the user perform one or more specific tasks. Application modules 20 may be bundled with computing platform 10, and/or may be published and/or distributed separately with computing platform 10. Application modules 20 may be contrasted with system software and/or middleware, which may be configured to manage and integrate the capabilities of computing platform 10, but may not directly apply such capabilities directly in the performance of tasks under the direction of and/or for the benefit of the user. By way of non-limiting example, one or more of application modules 20 may include an application suite, a business application, an enterprise application, a content access application, an educational application, a simulation application, a media development application, a product engineering application, a communications application, and/or other applications.

The specific tasks managed by application modules 20 may provide access to one or more activities to the user. An activity may include a task, a game, a conversation, an interaction with an electronic document or file (e.g., a textual file, an audio file, a video file, a multimedia file, and/or other documents or files), and/or other activities. In some implementations, an individual one of application modules 20 may provide access to a single activity. In some implementations, an individual one of application modules 20 may provide access to a plurality of activities.

An activity may include actions taken only locally on computing platform 10. For example, an activity may include an interaction with an electronic file that is stored locally to computing platform 10 (e.g., on electronic storage 18). An activity may include actions taken locally on computing platform 10 and actions taken remotely on one or more other computing platforms. For example, computing platform 10 may communicate with a server 28 and/or one or more client computing platforms 30 through a network 32. Activities that involve actions that take place on one or more of server 28 and/or at least one of client computing platforms 30 may include, for example, communications sessions, game sessions, interactions with a virtual space, interactions with a social network service, interactions with a micro-blogging service, and/or other interactive activities. Such activities may be accomplished in a server/client architecture, with server 28 operating as a server facilitating interactions between computing platform 10 and one or more of client computing platforms 30. Such activities may be accomplished in a peer-to-peer architecture between computing platform 10 and one or more of client computing platforms 30.

Interface modules 22 may be configured to generate graphical user interfaces associated with activities provided by application modules 20. The graphical user interfaces generated by interface modules 22 may present the activities to the user, and/or may facilitate interaction of the user with the activities. The graphical user interfaces generated by interface modules 22 may be presented to the user through electronic display 14. The graphical user interfaces may be the manifestation to the user of the execution of application modules 20 by processor 12. The graphical user interfaces may include one or more control fields. A control field may be configured to receive entry and/or selection of inputs to a given application module 20 associated with the graphical user interface presenting the activity of the given application module 20. Inputs may be made to a graphical user interface separate from any control field. Through the inputs, the user may control one or more objects or characters in an activity; input, edit, and/or remove content from an activity; adjust a parameter of an activity; and/or interact with an activity in other ways.

Interface modules 22 may include a first interface module 22a, a second interface module 22b, an nth interface module 22n, and/or other interface modules. In some implementations, an individual one of application modules 20 corresponds to a single one of interface modules 22 (e.g., and a single activity). For example, first application module 20a may correspond to only first interface module 22a. In such examples, first application module 20a may provide access to a single activity, which may be presented to the user in the graphical user interface generated by first interface module 22a. In some implementations, in individual one of application modules 20 may correspond to a plurality of interface modules 22 (e.g., and a plurality of activities). For example, second application module 20b may correspond to second interface module 22b, n[th] interface module 22n, and/or other interface modules. In such examples, second application module 20b may provide access to a plurality of activities, which may be presented to the user in the graphical user interfaces generated by second interface module 22b, n[th] interface module 22n, and/or other interface modules.

Touch input module 24 may be configured to detect inputs entered to computing platform 10 through touch sensitive surface 16. The inputs may be detected based on output signals generated by touch input module 24. Detecting inputs may include detecting specific gestures associated with specific control inputs or types of control inputs. Gestures may be detected based on one or more parameters of contact made by the user with touch sensitive surface 16. The parameters may include one or more of a number of concomitant contacts, a timing, a location, a motion direction, a motion length, a pressure, and/or other parameters.

In some implementations, touch input module 24 may be configured to detect input of a first control input, a second control input, and/or other control inputs. By way of non-limiting example, the first control input may include a double contact tap, and/or other inputs. A double contact tap may include an input in which the user makes two concomitant contacts. The amount of time during which both contacts are maintained simultaneously may be for more than an input duration. The double contact tap may require the contacts maintain a minimum amount of movement across touch sensitive surface 16. As a non-limiting example, the second control input may include a single contact tap. A single contact tap may include an input in which the user makes a single contact that lasts for an input duration. The single contact tap may require the contact maintain a minimum amount of movement across touch sensitive surface 16.

It will be appreciated that the differentiation between control inputs may be expanded to additional numbers of contacts. For example, a triple contact tap (e.g., with three fingers simultaneously) may correspond to a third control input that is different from the first control input and/or the second control input. As another example, a quadruple contact tap (e.g., with four fingers simultaneously) may correspond to a fourth control input that is different from the first, second, and/or third control input.

Figure 2:
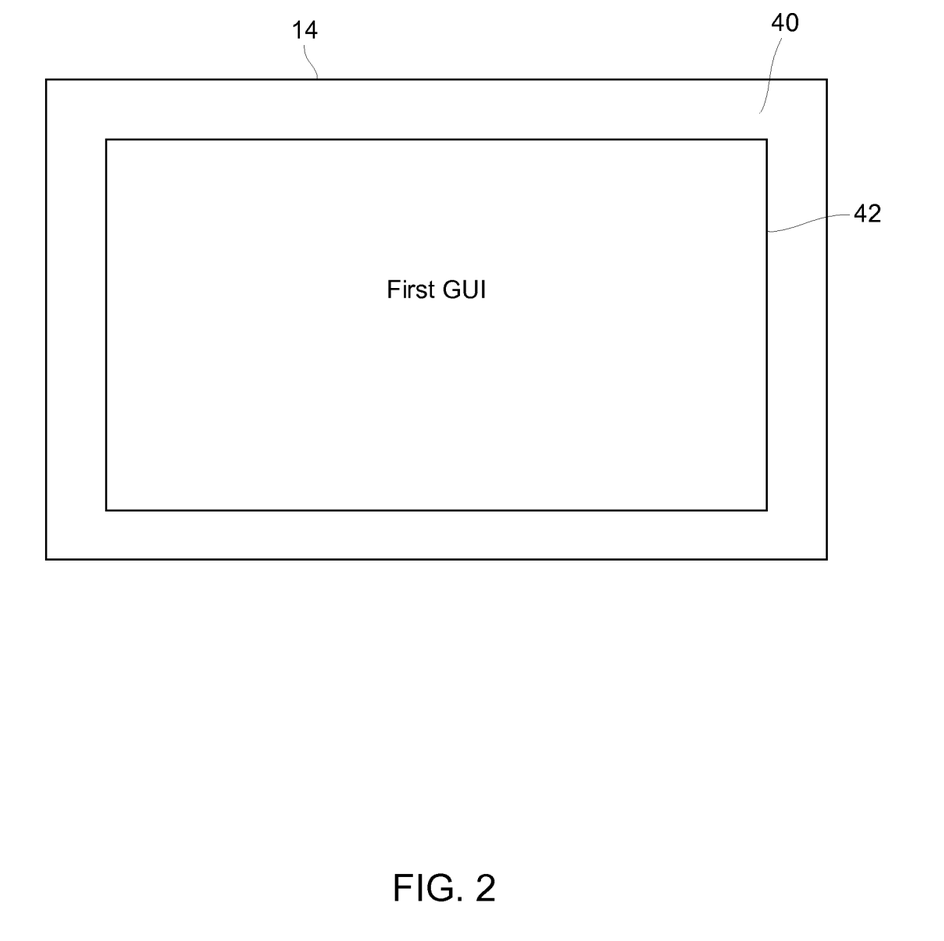
FIG. 2 illustrates a view of an electronic display operating in a first mode of operation.

Display control module 16 may be configured to control electronic display 14 to operate in a first mode, a second mode, and/or other modes. In the first mode, electronic display 14 may prominently display an active graphical user interface being generated by one of interface modules 22. By way of illustration, FIG. 2 shows a view 40 presented by electronic display 14 in the first mode. In view 40, a first graphical user interface 42 may be presented prominently as the active graphical user interface. As the active graphical user interface, first graphical user interface 42 may take up all or substantially all of view 40. Through first graphical user interface 42 the user is able to interact with a first activity presented in first graphical user interface 42. This may include viewing information presented through first graphical user interface 42 and/or providing inputs to first graphical user interface 42 through a touch sensitive surface (e.g., touch sensitive surface 16 shown in FIG. 1). In some implementations, the touch sensitive surface may be implemented with electronic display 14 as a touch screen.

While first graphical user interface 42 is the active graphical user interface in the first mode of operation of electronic display 14, an enhanced set of commands for the first activity may be available. Responsive to a different graphical user interface being the active graphical user interface in the first mode of operation, a reduced set of commands for the first activity may be available to the user. The reduced set of commands may include fewer than, if any of, the enhanced set of commands available to the user while first graphical user interface 42 is the active graphical user interface. While first graphical user interface 42 is the active graphical user interface in the first mode, an enhanced set of information about the first activity may be presented to the user. Responsive to a different graphical user interface being the active graphical user interface in the first mode of operation, a reduced set of information about the first activity may be available to the user. The reduced set of information may include less than, if any of, the enhanced set of information available to the user while first graphical user interface 42 is the active graphical user interface.

Figure 3:
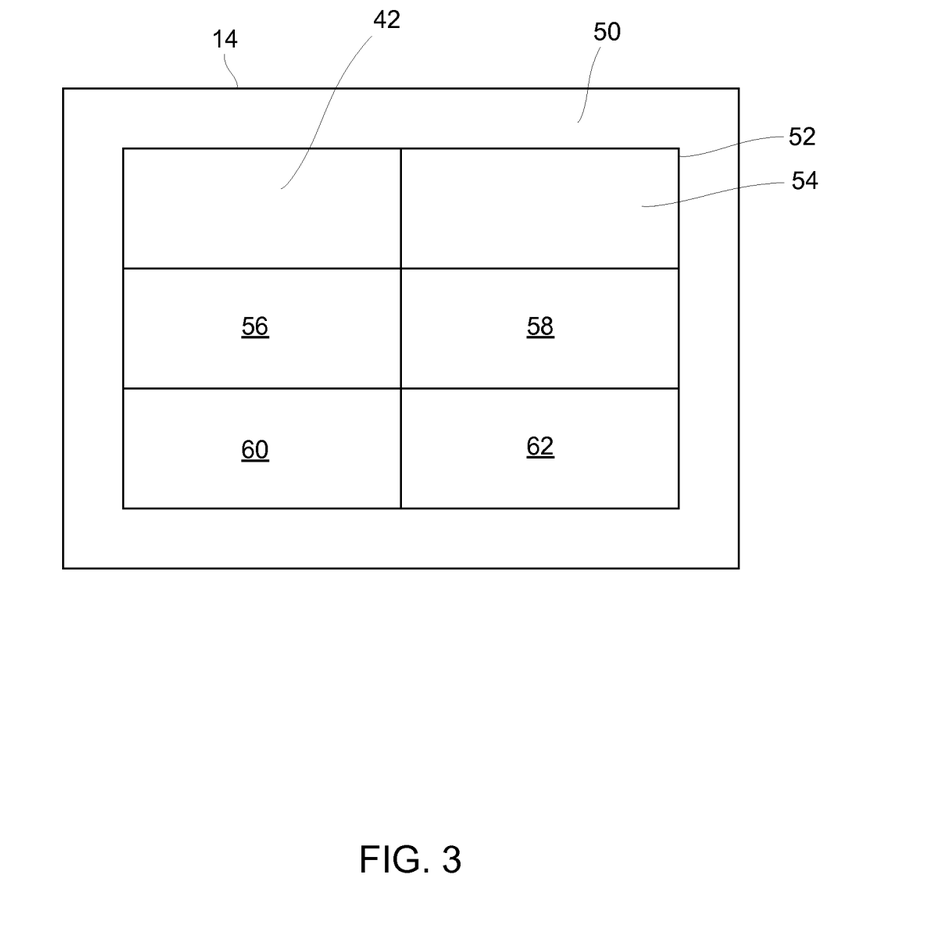
FIG. 3 illustrates a view of an electronic display operating in a second mode of operation.

FIG. 3 illustrates an exemplary view 50 of electronic display 14 operating the second mode of operation. In the second mode of operation, an array 52 of graphical user interfaces may be presented to the user. The graphical user interfaces presented may include graphical user interfaces generated by interface modules (e.g., interface modules 22 shown in FIG. 1) associated with a plurality of different activities. The graphical user interfaces may include first graphical user interface 42, a second graphical user interface 54, a third graphical user interface 56, a fourth graphical user interface 58, a fifth graphical user interface 60, an nth graphical user interface 62, and/or other graphical user interfaces. The graphical user interfaces presented in the second mode may include some or all of the graphical user interfaces corresponding to the activities currently being provided to the user.

The graphical user interfaces presented in the second mode may present some or all of the information presented responsive to individual ones of the graphical user interfaces being the active graphical user interface while electronic display 14 is operated in the first mode. For example, the presentation of first graphical user interface 42 in the second mode may include some or all of the information included in the enhanced set of information presented through first graphical user interface 42 as first graphical user interface 42 is the active graphical user interface (e.g., as shown in FIG. 2). As such, the information presented through first graphical user interface 42 in the second mode may be updated dynamically (e.g., in real time or near real time) as changes in the first activity occur. For example, responsive to the first activity being activity in which the user is participating with a plurality of other users over a network, interactions of one or more of the other users with the first activity may be reflected in first graphical user interface 42 during operation in the second mode. As such, view 50 provided by electronic display 14 in the second mode may provide an overview for the user over a plurality of activities.

Figure 4:
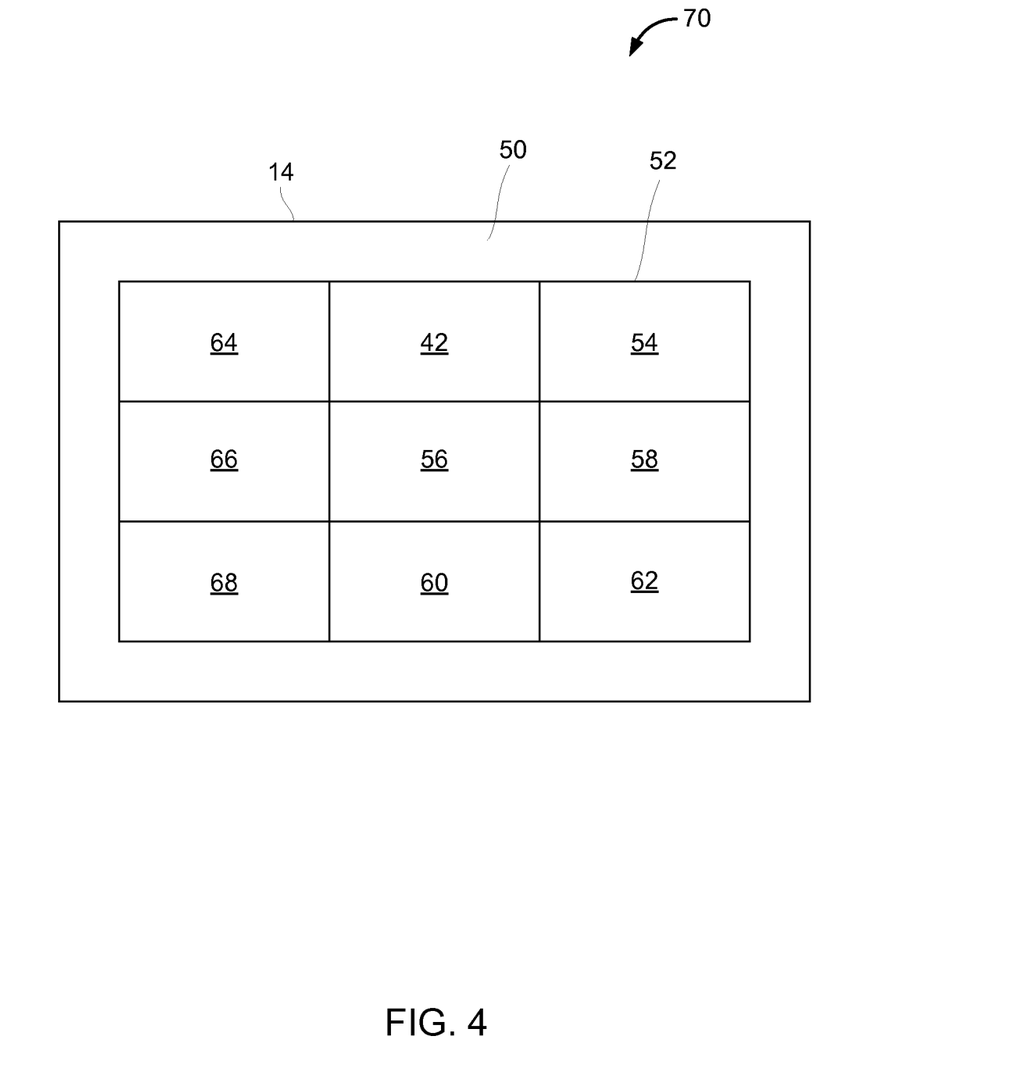
FIG. 4 illustrates a view of an electronic display operating a second mode of operation.

In some implementations, there may be more ongoing activities than can be presented in array 52 visible in view 50. In such implementations, the user may scroll through array 52 to view additional graphical user interfaces by providing control inputs to the touch sensitive surface, or through other control inputs. By way of illustration, FIG. 4 illustrates implementations in which a scrolling contact with the touch sensitive screen in a first direction 70 may cause array 52 to be scrolled in first direction 70. As can be seen in FIG. 4, this scrolling may cause second graphical user interface 54, fourth graphical user interface 58, and/or $n^{th}$ graphical user interface 62 to be moved out of view 50. The scrolling may cause one or more of a sixth graphical user interface 64, a seventh graphical user interface 66, an eighth graphical user interface 68, and/or other graphical user interfaces to come into view 50.

Returning now to FIG. 1, display control module 26 may be configured to cause electronic display 14 to selectively toggle between the first mode of operation, the second mode of operation, and/or other modes of operation. For example, while electronic display 14 is being operated in the first mode of operation, detection of the first control input by touch input module 24 may cause display control module 26 to change electronic display 14 into the second mode of operation. While electronic display 14 is being operated in the second mode of operation, detection of the second control input by touch input module 24 may cause display control module 26 to change electronic display 14 into the first mode of operation. In some implementations, in making this change, display control module 26 may cause a graphical user interface selected by the user in entering the second control input to be the active graphical user interface. Such a selection may include, for example, engaging touch sensitive surface 16 to enter the second control input at a location on touch sensitive surface 16 that corresponds to the selected graphical user interface. For example, in implementations in which electronic display 14 and touch sensitive surface 16 are implemented in a touch screen, the location on touch sensitive surface 16 corresponding to a given graphical user interface may include the location on electronic display 14 at which the given graphical user interface is displayed in the second mode of operation.

By way of illustration, turning to FIG. 2, to change electronic display 14 from the first mode of operation to the second mode of operation, the user may enter the first control input to the touch sensitive surface while view 40 is being displayed. Responsive to reception of the first control input, electronic display 14 may present view 50 shown in FIG. 3, which includes the previously active graphical user interface (e.g., first graphical user interface 42). From view 50, the user may enter the second control input to select one of the graphical user interfaces included in array 52 and cause electronic display 14 to switch back to the first mode of operation with the newly selected graphical user interface as the active graphical user interface.

Referring back to FIG. 1, processor 12 is configured to provide information processing capabilities in computing platform 10. As such, processor 12 may include one or more of a digital processor, an analog processor, a digital circuit designed to process information, an analog circuit designed to process information, a state machine, and/or other mechanisms for electronically processing information. Although processor 12 is shown in FIG. 1 as a single entity, this is for illustrative purposes only. In some implementations, processor 12 may include a plurality of processing units. These processing units may be physically located within the same device, or processor 12 may represent processing functionality of a plurality of devices operating in coordination. Processor 12 may be configured to execute modules 20, 22, 24, and/or 26 by software; hardware; firmware; some combination of software, hardware, and/or firmware; and/or other mechanisms for configuring processing capabilities on processor 12.

It should be appreciated that although modules 20, 22, 24, and/or 26 are illustrated in FIG. 1 as being co-located within a single processing unit, in implementations in which processor 12 includes multiple processing units, one or more of modules 20, 22, 24, and/or 26 may be located remotely from the other modules. The description of the functionality provided by the different modules 20, 22, 24, and/or 26 described below is for illustrative purposes, and is not intended to be limiting, as any of modules 20, 22, 24, and/or 26 may provide more or less functionality than is described. For example, one or more of modules 20, 22, 24, and/or 26 may be eliminated, and some or all of its functionality may be provided by other ones of modules 20, 22, 24, and/or 26. As another example, processor 12 may be configured to execute one or more additional modules that may perform some or all of the functionality attributed below to one of modules 20, 22, 24, and/or 26.

Electronic display 14 may be configured to present visual information to the user through a screen. Electronic display may include one or more of a liquid crystal display, a light emitting diode display, an organic light emitting diode display, projection display, a MEMs display, a plasma display, an electronic ink display, and/or other electronic displays.

Touch sensitive surface 16 may be configured to generate output signals conveying information related to contact with touch sensitive surface 16 made by the user. Contact made by the user may include direct contact with the user (e.g., by a finder of the user) and/or by an object under tactile control by the user (e.g., a stylus and/or other objects). The information conveyed by the output signals may include one or more parameters of contact with touch sensitive surface 16 by the user. The parameters may include one or more of a number of concomitant contacts, a timing, a location, a motion direction, a motion length, a pressure, and/or other parameters. Touch sensitive surface 16 may include a capacitive touch surface, an optical touch surface, and/or other touch surfaces. In some implementations, electronic display 14 and touch sensitive surface 16 may be implemented in a touch screen that provides the functionality of both electronic display 14 and touch sensitive surface 16.

Electronic storage 18 may comprise electronic storage media that electronically stores information. The electronic storage media of electronic storage 18 may include one or both of system storage that is provided integrally (i.e., substantially non-removable) with computing platform 10 and/or removable storage that is removably connectable to computing platform 10 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 18 may include one or more virtual storage resources (e.g., cloud storage, a virtual private network, and/or other virtual storage resources). Electronic storage 18 may store software algorithms, information determined by processor 12, information received from server 28, information received from clients 30, and/or other information that enables computing platform 10 to function as described herein.

Figure 5:
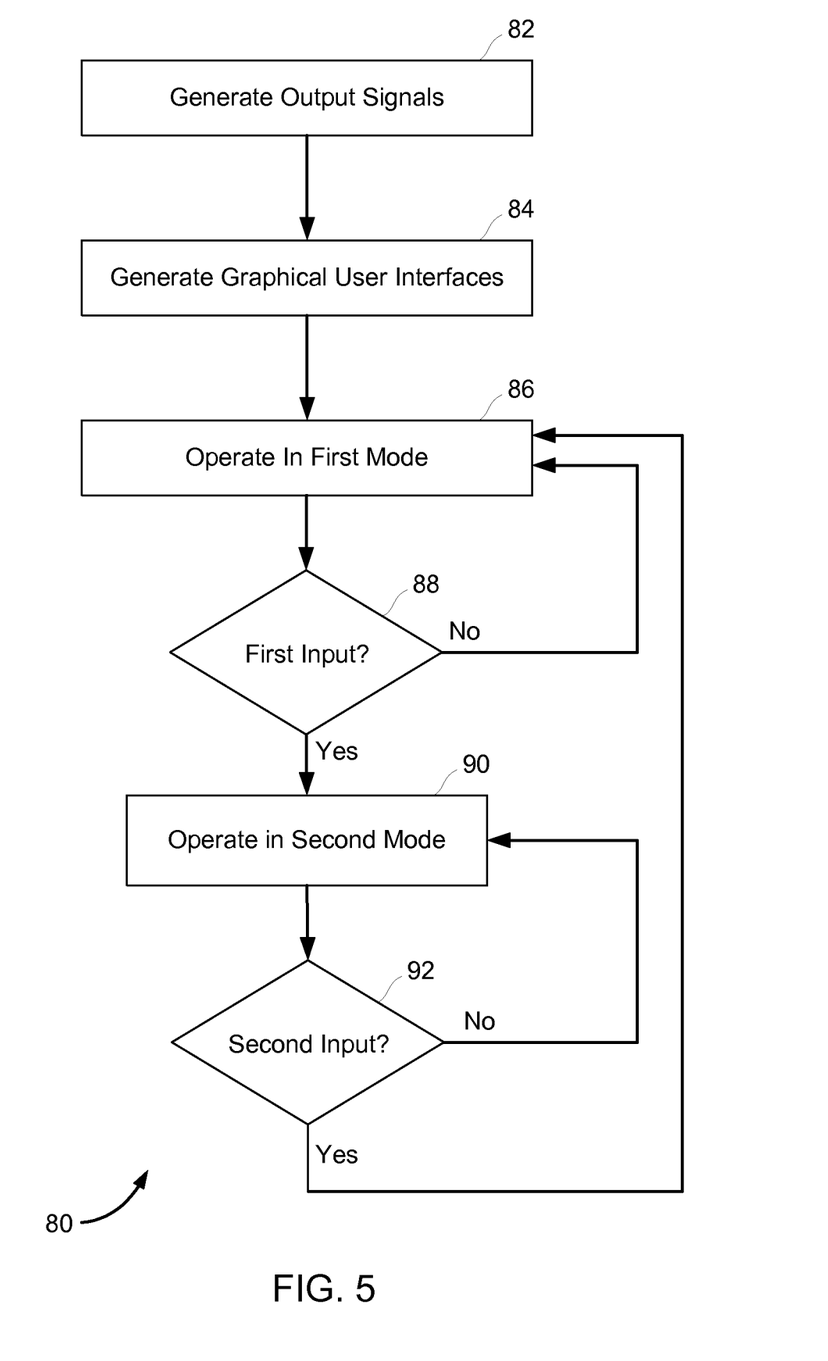
FIG. 5 illustrates a method of facilitating management by a user of a plurality of user interfaces associated with different activities.

FIG. 5 illustrates a method 80 of facilitating management by a user of a plurality of user interfaces associated with different activities. The operations of method 80 presented below are intended to be illustrative. In some embodiments, method 80 may be accomplished with one or more additional operations not described, and/or without one or more of the operations discussed. Additionally, the order in which the operations of method 80 are illustrated in FIG. 5 and described below is not intended to be limiting.

In some embodiments, method 80 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 80 in response to instructions stored electronically on an electronic storage medium. The one or more processing devices may include one or more devices configured through hardware, firmware, and/or software to be specifically designed for execution of one or more of the operations of method 80.

At an operation 82, output signals conveying information related to contact with a touch sensitive surface made by a user may be generated. In some implementations, operation 82 may be performed by a touch sensitive surface the same as or similar to touch sensitive surface 16 (shown in FIG. 1 and described herein).

At an operation 84, a plurality of graphical user interfaces may be generated for display to the user on an electronic display. The graphical user interfaces may be associated with different activities being presented to the user by a computing platform. The graphical user interfaces may include a first graphical user interface associated with a first activity, a second graphical user interface associated with a second activity, and/or other activities. In some implementations, operation 84 may be performed by interface modules the same as or similar to interface modules 22 (shown in FIG. 1 and described herein).

At an operation 86, the electronic display may be operated in a first mode. In the first mode, the electronic display may display an active graphical user interface prominently to facilitate user interaction with the activity associated with the active graphical user interface. In some implementations, operation 86 may be performed by a display control module the same as or similar to display control module 26 (shown in FIG. 1 and described herein).

At an operation 88, a determination may be made as to whether a first control input to the touch sensitive surface has been received. The determination may be made based on the generated output signals. Responsive to detection of the first control input at operation 88, method 80 may proceed to an operation 90. In some implementations, operation 88 may be performed by a touch input module the same as or similar to touch input module 24 (shown in FIG. 1 and described herein).

At operation 90, the electronic display may be operated in a second mode. In the second mode, an array of graphical user interfaces may be displayed concomitantly. In some implementations, operation 90 may be performed by a display control module the same as or similar to display control module 26 (shown in FIG. 1 and described herein).

At an operation 92, a determination may be made as to whether a second control input to the touch sensitive surface has been received. The determination may be made based on the generated output signals. Responsive to detection of the second control input at operation 92, method 80 may return to operation 86 to operate the electronic display in the first mode. The active graphical user interface during such operation may be a graphical user interface indicated by the user during entry of the second control input. In some implementations, operation 92 may be performed by a touch input module the same as or similar to touch input module 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computing platform configured to facilitate management by a user of a plurality of user interfaces associated with different activities, the platform comprising:

a touch sensitive surface configured to generate output signals conveying information related to contact with the touch sensitive surface made by the user, the touch sensitive surface being configured to detect a plurality of concurrent touches at different locations on the touch sensitive surface;

a touchscreen comprising an electronic display integrated into with the touch sensitive surface; and one or more hardware processors configured by machine-readable instructions to:

generate graphical user interfaces associated with different activities being presented to the user on the computing platform;

generate a first graphical user interface associated with a first activity;

generate a second graphical user interface associated with a second activity;

detect, based on the output signals generated by the touch sensitive surface, input to the touch sensitive surface of a first control input and a second control input, wherein detecting the input is based on detecting specific gestures based on parameters of contact including on one or more of a timing, a location, a motion direction, a motion length, or a pressure, wherein the second control input includes one or more of a single contact tap, a double contact tap, or a triple contact tap; and control the electronic display in (i) a first mode in which an active graphical user interface is displayed prominently on the electronic display to facilitate the user to interact with an active activity associated with the active graphical user interface such that by virtue of the first graphical user interface being the active graphical user interface, the first graphical user interface includes a first enhanced set of information about the first activity presented to the user and a first enhanced set of commands associated with the first activity provided through the first graphical user interface to facilitate the user to interact with the first activity, and by virtue of the second graphical user interface being the active graphical user interface, the first graphical user interface becomes inactive, wherein the first graphical user interface is less prominently displayed when inactive and includes a second reduced set of information about the first activity presented to the user and a second reduced set of commands associated with the first activity provided through the first inactive graphical user interface such that the second reduced set of commands includes fewer commands available to the user than the first enhanced set of commands and can be selected by the user to facilitate interaction by the user with portions of the first activity when the first graphical user interface is inactive and wherein the first graphical user interface remains inactive including persistent presentation of the second reduced set of commands in response to interaction by the user with portions of the first activity when the first graphical user interface is inactive; and (ii) a second mode in which an array of non-overlapping adjacent graphical user interfaces, having a predefined layout, are displayed substantially concurrently, the array of non-overlapping adjacent graphical user interfaces including the first graphical user interface, the first graphical user interface in the second mode reflecting interactions of other users in the first activity, and the first graphical user interface in the second mode updating dynamically in real time as interactions of the other users occur in the first activity;

and wherein when the electronic display is being operated in the first mode, responsive to detection of the first control input, operation of the electronic display is switched to the second mode, the first control input including a plurality of concurrent touches at different locations on the touchscreen maintained for more than a threshold duration of concurrent contact;

wherein when the electronic display is being operated in the second mode, responsive to detection of the second control input, operation of the electronic display is switched back to the first mode to display in the first mode a selected one of the graphical interfaces in the array of non-overlapping adjacent graphical interfaces; and wherein the touch sensitive surface receives control inputs that cause the array of non-overlapping adjacent graphical user interfaces to scroll so that additional graphical user interfaces are viewable.

2. The computing platform of claim 1, wherein the one or more hardware processors are further configured by machine-readable instructions such that the graphical user interface presented as the active graphical user interface is the graphical user interface corresponding to a location on the touch sensitive surface at which the second control input was input by the user.

3. The computing platform of claim 2, wherein the electronic display and the touch sensitive surface are implemented as a touch screen, and wherein locations on the touch sensitive surface corresponding to individual ones of the graphical user interfaces in the array are the locations on the touch screen at which the individual ones of the graphical user interfaces are displayed.

4. The computing platform of claim 1, wherein the first control input includes a double contact tap to the touch sensitive surface.

5. The computing platform of claim 1, wherein the second control input includes a single contact tap to the touch sensitive surface.

6. The computing platform of claim 1, further comprising a common application, and wherein the graphical user interfaces facilitate interaction with different activities within the common application.

7. The computing platform of claim 1, further comprising two or more different applications, and wherein the graphical user interfaces facilitate interaction with the different applications.

8. The computing platform of claim 1, wherein the first activity is an activity participated in by the user with a plurality of other users via a network, and wherein, responsive to the electronic display being operated in the second mode and displaying the array of graphical user interfaces including the first graphical user interface, the first graphical user interface reflects the interactions of the other users in the first activity.

9. The computing platform of claim 1, wherein where the second graphical user interface is the active graphical user interface, the one or more hardware processors are further configured by machine-readable instructions to detect, based on the output signals generated by the touch sensitive surface, input by the user with the second reduced set of commands associated with the first activity to control portions of the first activity.

10. The computing platform of claim 1, wherein the touchscreen is a pressure sensitive touchscreen configured to indicate an amount of pressure with which contact is made, and wherein the first control input is a gesture detected based on the amount of pressure.

11. A computer-implemented method of facilitating management by a user of a plurality of user interfaces associated with different activities, the method being implemented in a computer platform, including a non-transitory machine-readable storage medium, the computer platform comprising a touch sensitive surface, an electronic display, and one or more hardware processors configured by machine-readable instructions, the method comprising:

generating output signals conveying information related to contact with a touch sensitive surface made by a user, the touch sensitive surface being configured to detect a plurality of concurrent touches at different locations on the touch sensitive surface;

generating graphical user interfaces for display to the user on an electronic display integrated into the touch sensitive surface, the graphical user interfaces being associated with different activities being presented to the user on the computing platform, the graphical user interfaces comprising:

a first graphical user interface associated with a first activity; and a second graphical user interface associated with a second activity;

detecting, based on the generated output signals, input to the touch sensitive surface of a first control input and a second control input, wherein detecting the input is based on detecting specific gestures based on parameters of contact including on one or more of a timing, a location, a motion direction, a motion length, or a pressure, wherein the second control input includes one or more of a single contact tap, a double contact tap, or a triple contact tap; and controlling the electronic display in (i) a first mode in which an active graphical user interface is displayed prominently on the electronic display to facilitate the user to interact with an active activity associated with the active graphical user interface, such that by virtue of the first graphical user interface being the active graphical user interface, the first graphical user interface includes a first enhanced set of information about the first activity presented to the user and a first enhanced set of commands associated with the first activity provided through the first graphical user interface to facilitate the user to interact with the first activity, and by virtue of the second graphical user interface being the active graphical user interface, the first graphical user interface becomes inactive, wherein the first graphical user interface is less prominently displayed when inactive and includes a second reduced set of information about the first activity presented to the user and a second reduced set of commands associated with the first activity provided through the first inactive graphical user interface such that the second reduced set of commands includes fewer commands available to the user than the first enhanced set of commands and can be selected by the user to facilitate interaction by the user with portions of the first activity when the first graphical user interface is inactive and wherein the first graphical user interface remains inactive including persistent presentation of the second reduced set of commands in response to interaction by the user with portions of the first activity when the first graphical user interface is inactive; and (ii) a second mode in which an array of non-overlapping adjacent graphical user interfaces, having a predefined layout, are displayed substantially concurrently, the array of non-overlapping adjacent graphical user interfaces including the first graphical user interface, the first graphical user interface in the second mode reflecting interactions of the other users in the first activity, and the first graphical user interface in the second mode updating dynamically in real time as interactions of the other users occur in the first activity;

wherein such control comprises, as the electronic display is being operated in the first mode and responsive to detection of the first control input, switching operation of the electronic display to the second mode, the first control input including a plurality of concurrent touches at different locations on the touchscreen maintained for more than a threshold duration of concurrent contact;

wherein as the electronic display is being operated in the second mode and responsive to detection of the second control input, switching operation of the electronic display back to the first mode so as to display in the first mode a selected one of the graphical interfaces in the array of non-overlapping adjacent graphical interfaces; and wherein the touch sensitive surface receives control inputs that cause the array of non-overlapping adjacent graphical user interfaces to scroll so that additional graphical user interfaces are viewable.

12. The method of claim 11, wherein as operation of the electronic display is switched to the first mode, the graphical user interface presented as the active graphical user interface is the graphical user interface corresponding to a location on the touch sensitive surface at which the second control input was input by the user.

13. The method of claim 12, wherein the electronic display and the touch sensitive surface are implemented as a touch screen, and wherein locations on the touch sensitive surface corresponding to individual ones of the graphical user interfaces in the array are the locations on the touch screen at which the individual ones of the graphical user interfaces are displayed.

14. The method platform of claim 11, wherein the first control input includes a double contact tap to the touch sensitive surface.

15. The method of claim 11, wherein the second control input includes a single contact tap to the touch sensitive surface.

16. The method of claim 11, wherein the graphical user interfaces presented by the electronic display in the second mode facilitate interaction with different activities within a common application.

17. The method of claim 11, wherein the graphical user interfaces presented by the electronic display in the second made facilitate interaction with two or more different applications.

18. The method of claim 11, wherein the first activity is an activity participated in by the user with a plurality of other users via a network, and wherein, responsive to the electronic display being operated in the second mode and displaying the array of graphical user interfaces including the first graphical user interface, the first graphical user interface reflects the interactions of the other users in the first activity.

19. The method of claim 11, wherein the second graphical user interface is the active graphical user interface, the method further comprises:

detecting, based on the output signals generated by the touch sensitive surface, input by the user with the second reduced set of commands associated with the first activity to control portions of the first activity.

20. The method 11, wherein the touch sensitive surface is configured to indicate an amount of pressure with which contact is made, and wherein the first control input is a gesture detected based on the amount of pressure.

* * * * *